United States Patent [19]

Eide

[11] 3,909,592

[45] Sept. 30, 1975

[54] STOVE TOP ASSEMBLY

[75] Inventor: Svein Eide, Sandved, Norway

[73] Assignee: Polaris Fabrikker A.S., Sandnes, Norway

[22] Filed: Jan. 2, 1975

[21] Appl. No.: 538,120

Related U.S. Application Data

[63] Continuation of Ser. No. 413,430, Nov. 7, 1973 now abandoned.

[52] U.S. Cl. ............... 219/462; 219/445; 219/464; 219/540
[51] Int. Cl.² ......................................... H05B 3/68
[58] Field of Search ........... 219/430, 438, 439, 441, 219/442, 445, 461, 462, 463, 464, 530, 540; 126/39 M, 390; 29/494, 495

[56] References Cited
UNITED STATES PATENTS

| | | | |
|---|---|---|---|
| 2,640,906 | 6/1953 | Haynes | 219/445 |
| 2,786,929 | 3/1957 | Michaelis | 219/464 X |
| 3,095,498 | 6/1963 | Foster | 219/441 |
| 3,445,630 | 5/1969 | Ulam | 219/438 |
| 3,569,672 | 3/1971 | Hurko | 219/464 |
| 3,622,754 | 11/1971 | Hurko | 219/462 |
| 3,739,149 | 6/1973 | Fischer et al. | 219/445 |
| 3,781,522 | 12/1973 | Boron | 219/462 |

*Primary Examiner*—Volodymyr Y. Mayewsky

[57] ABSTRACT

The invention relates to a stove top assembly wherein the stove includes a thin sheet of ductile material such as stainless steel having low heat conductivity characteristics. Individual heating units beneath the top sheet are in spaced relation to each other with each heating unit including a center layer of good conducting material such as aluminum or copper in abutting contact with the upper sheet of material. Each heating unit has a lower layer or sheet of ductile material in abutting engagement with the center layer of material. Electrical heating elements are associated with each of the heating units. The upper sheet of ductile material acts as a bridge between each heated and unheated area and operates in hinge-like fashion to compensate for horizontally directed thermal expansion of the heated area.

10 Claims, 12 Drawing Figures

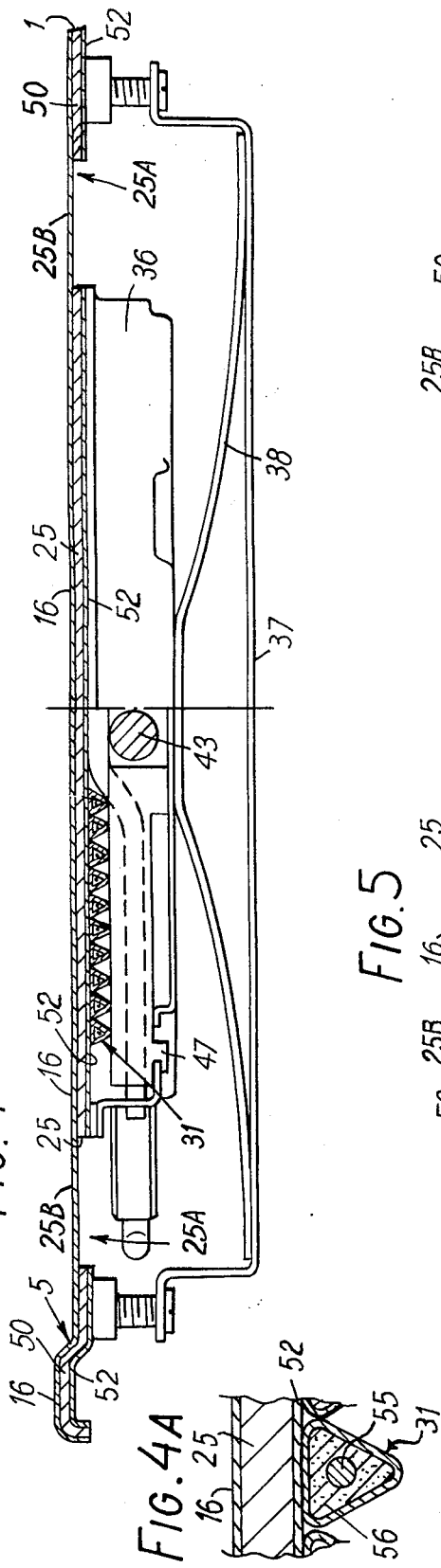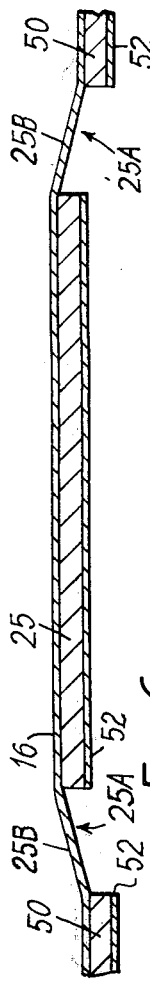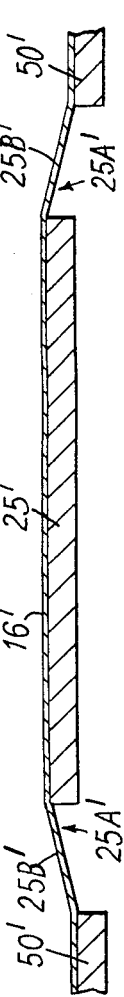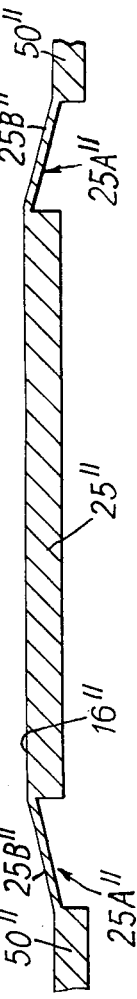

STOVE TOP ASSEMBLY

This is a continuation-in-part application of application Ser. No. 413,430 filed Nov. 7, 1973, now abandoned.

The invention relates to a stove top assembly in which one or more heated areas are connected together with a thin sheet of lower conductivity material such as stainless steel to form a single integrated unit.

Cast electrical hotplates are normally made of cast iron but this material has many disadvantages. Cast iron rusts and corrodes, has low strength compared with steel, and the heat conductivity of the material is poor. These properties may cause uneven loads which result in overheating and short lifetimes for the heating elements. Local overheating may also result in cracking or tendency to warp. To some extent this tendency is reduced by making a hole in the middle of the hot plate but this also causes the heat contact area to be reduced.

Prior art teaches that electrical hot plates be made of a special alloy of stainless steel and electrical hot plates made of aluminum with thin sheets of stainless steel bonded to each side thereof are known to the prior art. Also known in the prior art is that heating elements may be cast into the aluminum and between the two sheets of stainless steel.

It is also known that a stove top can be made of ceramic but that construction has severe limitations. One disadvantage is that ceramics are brittle and break suddenly when overloaded without any plastic deformation. There are also limitations relating to the surface temperature of the heated areas and the strengths of the units.

In U.S. Pat. No. 2,640,906 an electrical heating device is disclosed having conductive and nonconductive layers sandwiched together. According to the invention of that patent the stove top has uniform thickness and the nonconductive layer thereof is glass or a similar material. The top surface may be metallic but only in the form of a film or a thin coating which would not be self supporting. This thin metal coating is bonded to the supporting layer of glass or similar material. The difference in the elongation coefficients between glass and metal is also a limiting factor relative to surface temperatures of the heated areas. A disadvantage with a construction suggested in U.S. Pat. No. 2,640,906 is also that the heating elements can not be replaced because the conductive and nonconductive layers are fused together.

A heating device according to the present invention is an improvement over other systems such as those referred to above. Heating units in accordance with the present invention may be of a single ductile material or may have a sandwich type construction. The sandwich construction might be three ply with a relatively thick layer of a metal with good heat conductivity such as aluminum or copper in the middle with relatively thin layers of a material with low heat conductivity such as stainless steel on opposite sides thereof. A sandwich construction such as this does not in itself contain any heating elements. The heat source may be of any type placed exteriorly of the unit such as a tube element, for example. Aluminum, when used as a middle layer, has a heat conductivity factor of approximately 190 k cal/m.h.°C, and stainless steel is approximately 15 K cal/m.h. °C. The thickness of the layers depend on the materials used. If the middle layer is aluminum it may have a thickness of from 0.5 to 10 mm. The surface layers of stainless steel would have a thickness of from 0.1 mm to 0.8 mm.

It is one of the objects of this invention to provide a heating device that is waterproof and one which is also smooth and easy to clean. The top layer is therefore in one piece but may be shaped or formed in the way that the heated areas thereof will be situated in different areas of the top surface. On the underside, however, the heated and unheated areas are separated from each other by reason of the lower layer of aluminum or copper being partly removed. In effect the air space between heated and unheated areas functions as a barrier for transport of thermal energy between these areas. The separative width may be from 5 to 100 mm depending on the thickness of the different layers and the desired stability.

The loss of heat over the bridge between the heated and unheated areas is negligible. When the upper layer is stainless steel the thickness of metal forming the bridge should preferably be between 0.2 and 0.5 mm.

It has been found by tests that after 8 hours of continuous heating a bridge with dimensions of 0.9 × 80 mm will be about 45°C. at the cold end while the hot skide will be about 200°C. The transport of heat through metal is directly proportional with the cross section thereof and the reduction from 0.9 mm to 0.3 mm in thickness causes the heat transfer over the bridge to be reduced to one third of the original heat transfer. The loss of energy may be calculated in accordance with the following equation:

$$\frac{Q}{h} = \lambda \frac{F \cdot t}{d}$$

Calculations show that, for a stainless steel bridge with dimensions of 80 × 0.9 mm and a difference in temperature of 150°C, the loss of energy will be 3.7 watts which is less than one-half of one percent of the input.

The heated areas are connected to electrical heating elements or other heat sources. The heated areas are isolated from the unheated areas to prevent heat transfer by radiation. The heat is to be evenly distributed entirely throughout the middle layer of the unheated area. When a metal sandwich is used, the two outer layers will keep each other in thermal balance and thus counteract a bimetallic action. The heated area will expand linearly and remain flat or unwarped. The elongation is absorbed by the bridge which will function in this instance as a hinge. Without this mode of operation the top sheet would be caused to bend or wrinkle. The system operates in such a way that only the temperature of the heated area is raised or lowered in relation to the ambient temperature. The bridge between heated and unheated areas may preferably be formed as an inclined plane to facilitate the hinging action referred to above.

It will be understood that it is an important part of the invention that the bridge be made of ductile material which is strong enough to act as a hinge. Also the quantity of heat which passes over the bridge and distributed over the unheated area will escape through the air.

As a modification the heated and unheated areas may also be separated by baffling means which deter the flow of heat from one area to another. Also, it may be arranged that the heated areas be three ply with the unheated areas being two ply except for the bridge which is one ply. With this arrangement the cooling effect in the unheated areas will be better.

The advantages of the invention may be summarized by noting that a stove unit embodying the invention is water-proof, that the top surface of the stove unit may be made of a ductile material such as stainless steel thereby incorporating the corrosion resistance and decorative effect of stainless steel, that the heating device is in one piece, and that the stove unit may be conveniently combined with a drainboard and sink unit, or a worktable, for example, and will thereby save space.

The system embodying the invention increases the possibilities for better architectural arrangements of the cooking area. The heated and unheated areas of the stove top may, for example, be formed in squares with some being heated and some being cold. The different areas or squares may be given different surface treatments such as chromium plating, chromic acid coloring enameling, etc. to protect the stainless steel from discoloration by heat oxidation.

An advantage of having a middle layer of a material with good heat conductivity is the resulting efficient heat distribution with heat being efficiently transferred from the heating elements. A hot plate with this construction is therefore not susceptible to uneven loading. It is for example not necessary as a protective measure to have the diameter of the hotplate be equal to the diameter of the saucepan.

The invention is not limited to use in connection with a stove top but also has other uses such as for heated panels, restaurant tables with heated areas, electrical ovens, footwarmers and the like.

Other objects of the invention will become apparent from the following specification, drawings and appended claims.

In the drawings:

FIG. 4 is a vertical front view of the fragmented assembly shown in FIG. 3 with a portion of the reflector pan removed to show the contents thereof;

FIG. 4A is an enlarged fragmentary portion of FIG. 4 which shows, in section, the heating element associated with the stove top panel;

FIG. 5 is an enlarged, fragmented, vertical sectional view of the surface unit shown in the assembly illustrated in FIGS. 1 to 4;

FIG. 6 is similar to FIG. 5 and represents a second embodiment of the invention;

FIG. 7 is similar to FIGS. 5 and 6 and represents a third embodiment of the invention;

Figure 1:
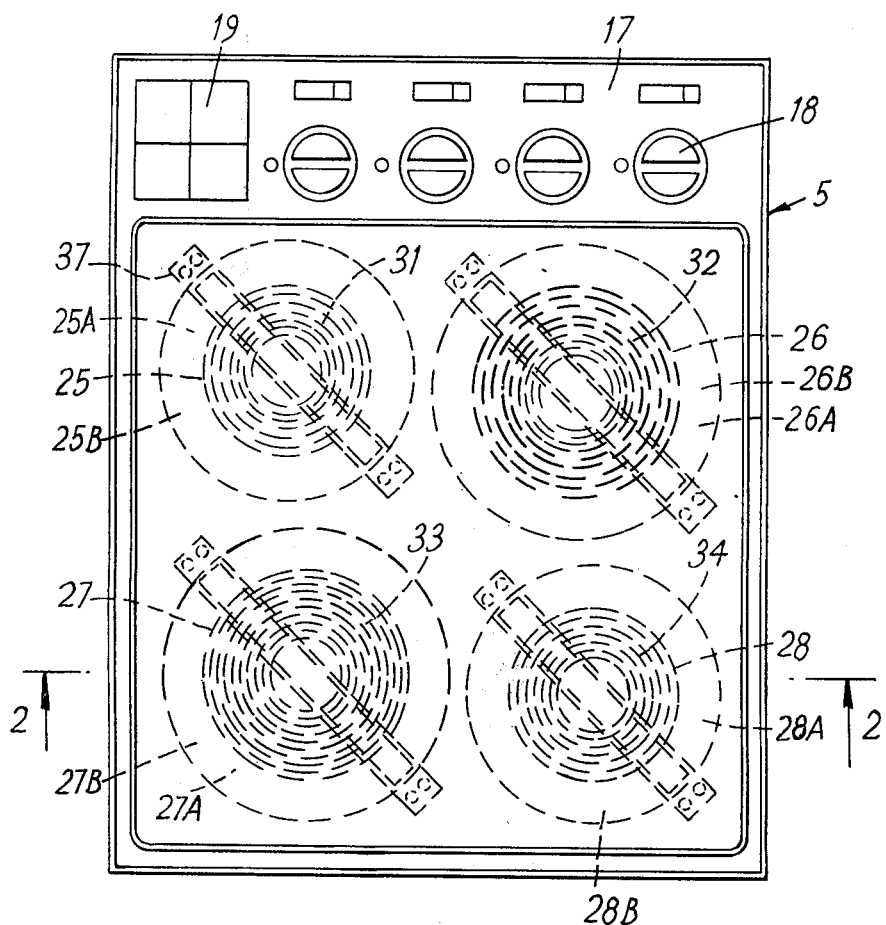
FIG. 1 is a top plan view of a stove top assembly of the type to which the invention hereof is applicable.
Figure 2:
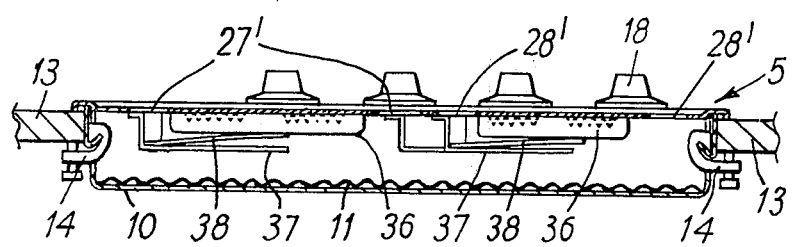
FIG. 2 is a vertical sectional view taken on line 2—2 of FIG.

Referring to the drawings:

FIGS. 1 and 2 show a stove top assembly of a type to which the invention hereof is applicable. The assembly comprises a rectangularly, box shaped housing 10 having an open top and a flanged upper edge. Housing 10 may be lined with a thin aluminum foil 11 and is mounted or attached to a countertop 13 by screws or the like (not shown).

With a preliminary reference to FIG. 4, a multi-ply panel 5 may be utilized as a top member for the stove assembly. The panel 5 comprises thin upper and lower sheets 16 and 52 of a low heat conductivity material such as stainless steel and a relatively thick layer 50 of a metal therebetween, having good heat conductivity, such as aluminum or copper.

Referring back to FIG. 1, the top member of multi-ply panel 5 spans the plan view perimeter of the housing 10 and has a portion 17 which extends beyond the housing, on one side thereof, to accommodate burner control knobs 18 and indicator lights 19.

The perimeter of the panel 5 may be formed as a flange which engages the flanges upper edge of the housing 10 and the panel 5 may be maintained in that position by means of brackets 14.

Four heating areas or units are formed by removing four annularly shaped portions (not shown) of the two lower plys 50 and 52 which results in the formation of four circular or disk shaped sections 25 to 28 under the sheet 16 which may either be separately bonded or fastened to the sheet 16 or be integrally formed with it. Annularly shaped air spaces 25A to 28A surround the disk shaped sections 25 to 28 as a result of having removed the annularly shaped portions.

Beneath the sections 25 to 28 are spirally formed electric resistance heating elements 31 to 34 which conveniently have somewhat smaller diameters than the respective metal sections 25 to 28 with which they are associated.

Four reflector pans 36 respectively surround the heating elements 31 to 34. The reflector pans are mounted or attached with brackets 37 and leaf springs 38 as illustrated.

Figure 3:
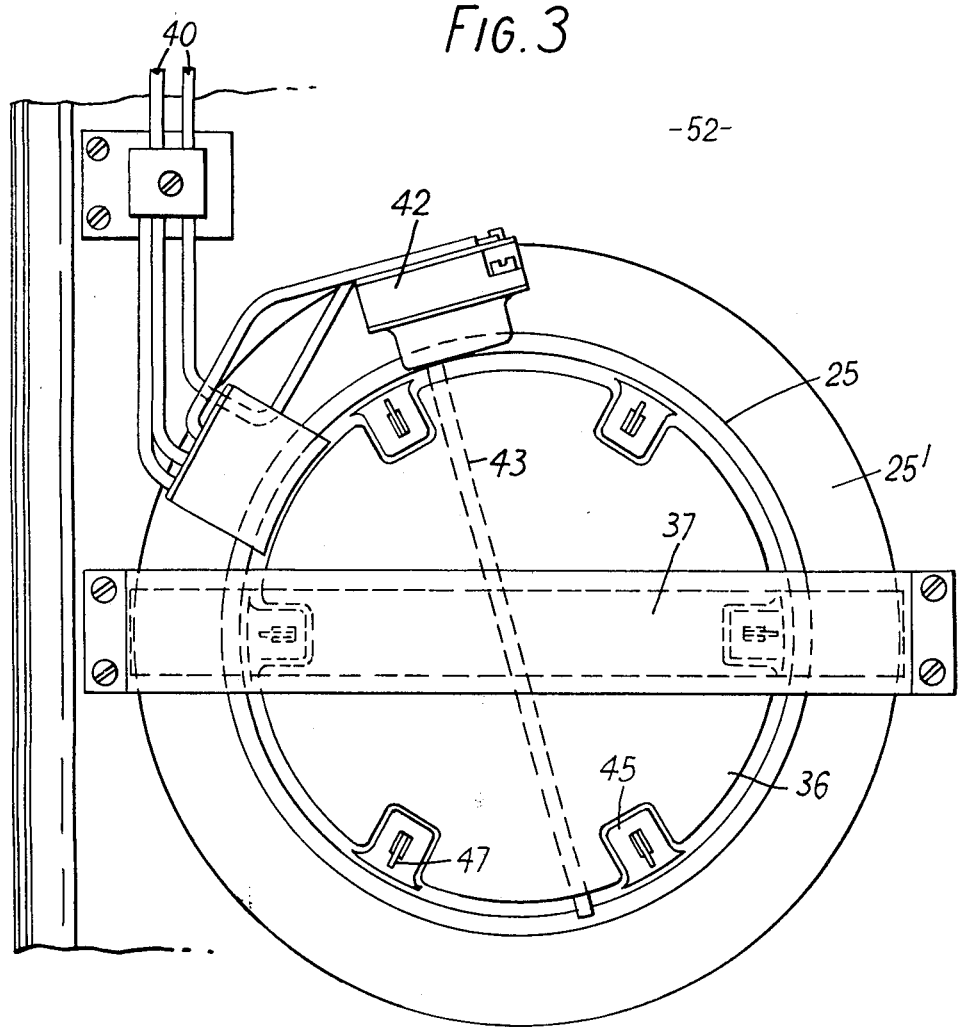
FIG. 3 is a fragmented bottom view showing a portion of a stove top assembly similar to that shown in FIG. 1 in which only one of the four heating elements is illustrated.

FIGS. 3 and 4 show the structure associated with heating element 31 of the assembly of FIGS. 1 and 2 which structure is substantially similar to corresponding structure associated with heating elements 32 to 34. One very minor difference between FIG. 1 and FIG. 3, however, is that the bracket 37 is shown in a different position in FIGS. 3 and 4 so as to simplify the drawings.

Important characteristics of the sheet metal panel 16 is that it has a heat conductivity factor of less than 30K. cal/m.h. C°, which is true for stainless steel, and has a thickness between 0.1 and 0.8 mm.

Electrical leads 40 are provided for supplying electrical energy to the heating element 31. A thermostat 42 is fastened by virtue of the sensing stick 43 thereof passing through holes provided in the reflector pan 36. Recesses 45 are formed in the reflector pan 36 which provide for the attachment thereto of four combs 47 which support the heating element 31 in a pressed or biasing engagement with the circular metal section 25.

The heating elements 31 to 34 are conventional in construction with the metal core 55 thereof being surrounded by an electrical insulating material 56 which has good heat transmitting characteristics. As indicated above, the reflector pan 36 and the heating element 31 are resiliently biased against the circular metal section 25 by the spring 38. Metallurgical soldering or welding could also be used to attach the heating element 31 and the pan 36 to the metal section 25 within the scope of the invention.

FIG. 5 shows an enlarged, fragmented, vertical sectional view of the surface panel shown in the stove assembly illustrated in FIGS. 1 to 4.

As shown in FIG. 1 the annularly shaped portions of panel 16 which surround the disk sections 25 to 28 are referred to for convenience as bridging portions 25B to 28B. Referring to FIG. 4, when the heating element 31 is not energized, the annularly shaped bridging portion 25B is in the same horizontal plane as the surrounding portions of sheet 16 and thus lies flat as shown in FIG. 4. When the heating element 31 is energized, the linear expansion of the aluminum or copper layer 25 causes bridging portion 25B to assume an inclined position, or frustoconical shape, as shown in FIG. 5. At the same time the disk section 25 assumes a raised position which is parallel to its original position.

The bridging portions may be highly polished for better light reflection.

The panel 16 is a sheet of ductile material having a low heat conductivity. The annular air space 25A surrounding disk 25 provides thermal isolation for the heating unit and, in combination with the low heat transmission efficiency of the bridging portion 25B, form the basis for the concept of the invention.

The sheet or panel 16 is thus completely flat at room temperatures but the portion 25B thereof rises when heated as shown in FIG. 5. Spills on the other parts of sheet 16 are prevented from flowing to the raised part and this is an advantage of the invention. Another advantage from the standpoint of safety is that a raised portion signifies that it is hot and this information to a user of the equipment could prevent accidents from occurring.

FIG. 6 is similar to FIG. 5 and represents a second embodiment of the invention in a heated state. This embodiment is a two ply version of the invention in which the lower layer of stainless steel or the like is omitted. Single prime reference numerals are used for parts which correspond to parts of the embodiment of FIG. 5.

FIG. 7 is similar to FIGS. 5 and 6 and represents a third embodiment of the invention in a heated state. In this embodiment the sheet or panel comprises a homogeneous ductile material having a relatively low heat conductivity index such as stainless steel, or the like. Double prime reference numerals are used for parts which correspond to parts of the embodiments of FIGS. 5 and 6.

Figure 8:
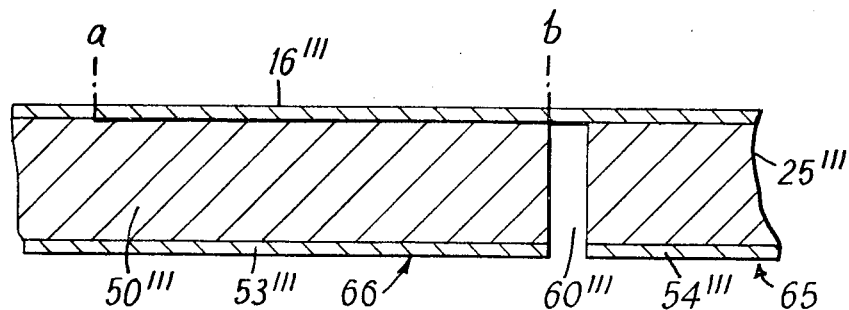
FIGS. 8 and 9 are generally similar to FIG. 5 and represent respectively the cold and hot states of a fourth embodiment of the invention.
Figure 9:
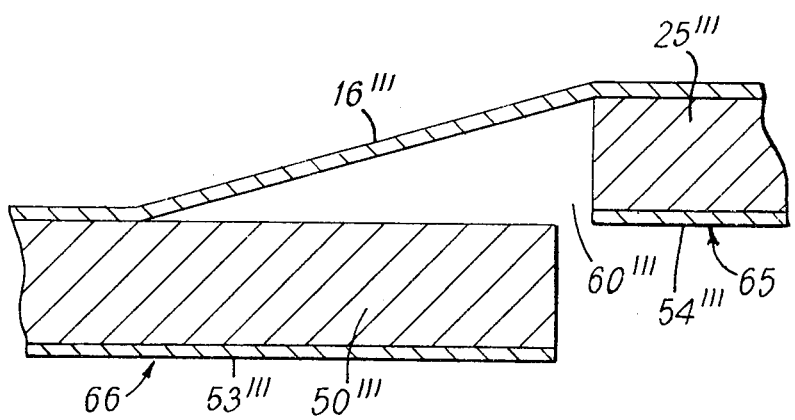

FIGS. 8 and 9 are similar to FIGS. 5 and 6 and represents a fourth embodiment of the invention. From the standpoint of concept this embodiment may be three ply as in FIG. 5 or two ply as in FIG. 6. Triple prime reference numerals are used for parts which correspond to parts of the embodiments of FIGS. 5 and 6. The invention of this embodiment involves a construction where the spacing of a burner unit 65 from an adjacent stationery supporting structure 66 is so close that a bridge therebetween would not allow or permit adequate expansion as in the other embodiments. A difference in the embodiment of FIGS. 8 and 9 is that the panel of sheet 16''' is not bonded or otherwise attached to the middle layer 50''' between the points a and b indicated in FIG. 8. When the burner unit 65 rises due to heat and expansion as indicated in FIG. 9, a portion of the sheet 16''' lifts away from the middle layer 50''' so as to accommodate the relative vertical movement of the burner unit 65. Advantages of this embodiment is that although the layers 50''' and 25''' are in close proximity when the unit 65 is in a cold state, the separating space 60''' between said layers increases sufficiently when the unit 65 is in a hot state such that the thermal isolation due solely to spacing can easily be arranged to be adequate. The closeness of the middle layers 50''' and 25''' during the cold state gives greater protection against denting when the panel or sheet 16''' is used as a table top.

Figure 10:
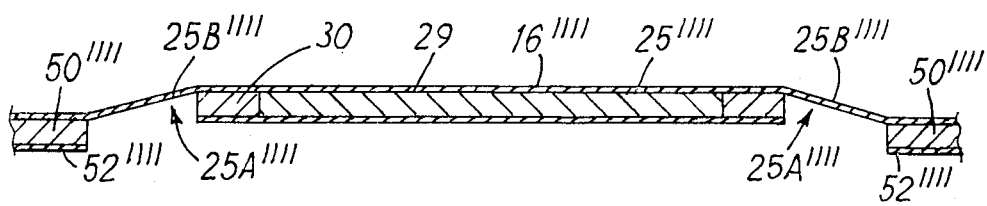
FIG. 10 is similar to FIG. 5 and represents a fifth embodiment of the invention.

FIG. 10 is similar to FIG. 5 and represents a fifth embodiment of the invention. In this embodiment the heat distribution layer corresponding to layer 25 in FIG. 5 consists of more than one metal which are a disk 29 and an outer ring 30. The metal of the outer ring 30 has a higher expansion than the disk 29 and, if a ring surrounding ring 30 were provided, it would be of a metal having a still higher coefficient. This will prevent the heated section from bending.

Figure 11:
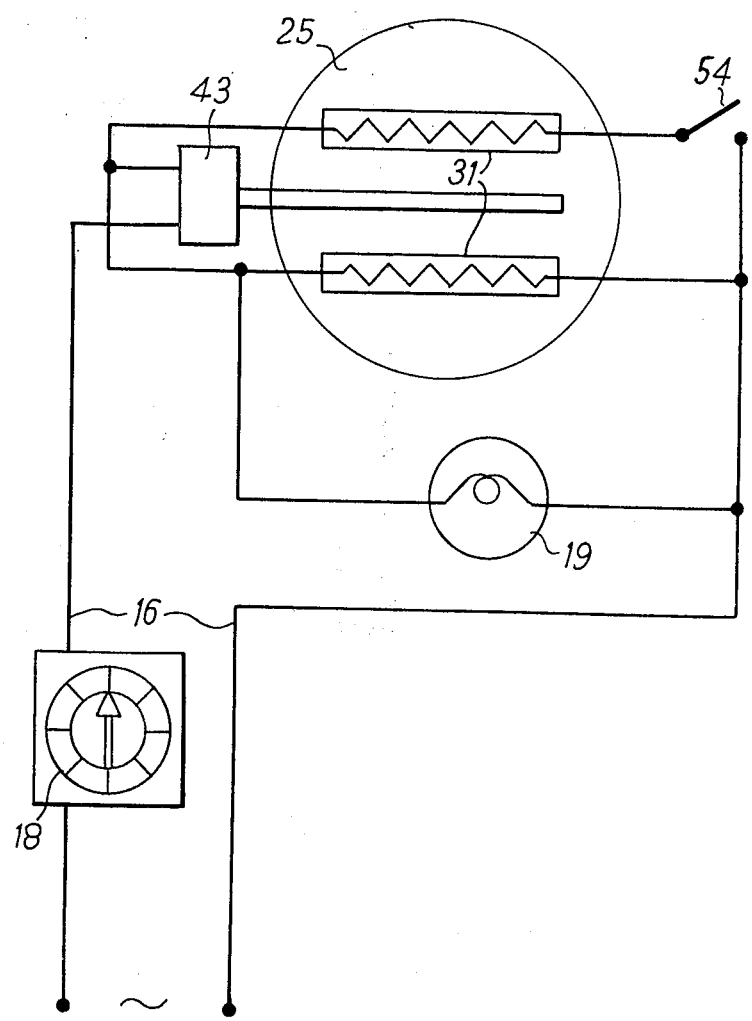
FIG. 11 is a schematic electrical circuit diagram for one heating unit as shown in FIGS. 3 and 4.

In FIG. 11 is shown a schematic electrical circuit diagram for one heating unit as shown in FIGS. 3 and 4. Corresponding numbers apply to FIG. 11 for conductors 16, energy regulator 18, indicator lamp 19, thermostat 43, heating elements 31 and the disk shaped element 25 which has good heat conductivity. The only new element in FIG. 11 is the push button switch 54.

In each of the embodiments of the invention there is a bridging concept with the bridges, such as the annular bridge 25B illustrated in FIG. 5, having hinging action at each end thereof to accommodate the expansion of an adjacent burner unit. This bridging concept is related to the feature that the sheet or panel 16 is a single sheet of material instead of a number of pieces joined by soldering or welding. Welding and soldering produce brittle seams because traces of other materials tend to chaange a stainless steel alloy in a manner to cause substantial changes in the resilient characteristics thereof. Stainless steel alloys are very sensitive in this respect and an added factor is that substantial changes in the crystal structure thereof are normally brought about by the application thereto of a welding operation.

The creation of a brittle seam as mentioned above would make the seam susceptible to fatigue failure after a few hundred bendings which result from the alternate heating and cooling of the seam in the normal course of using the unit.

I claim:

1. A stove top assembly or the like comprising a thin layer of ductile metallic material, at least one heating unit beneath said ductile layer attached thereto, said heating unit including a first heat distributing layer of metallic material in contact with said layer of ductile material, a second heat distributing layer of metallic material in surrounding and spaced relation to said first layer and being in contact with said layer of ductile material, said layer of ductile material forming a bridge between said first and second layers, said bridge having a hinging action to accommodate thermal expansion, said layer of ductile material having a heat conductivity factor less than 50 K cal/m.h.°C and a thickness of 0.1 mm to 0.8mm, said heating unit including electric heating means for heating said heat distributing layer and heat insulating means beneath said heating unit.

2. A stove top assembly according to claim 1 wherein said layer of ductile material is stainless steel and has a thickness of 0.2 to 0.5 mm.

3. A stove top assembly according to claim 1 wherein said first and second layer of heat distributing material material are integral with said layer of ductile material.

4. A stove top assembly according to claim 1 wherein said first heat distributing layer of material is separate from said sheet of ductile material and has good heat conductivity, said heat distributing layer having a thickness of 0.5 to 10 mm.

5. A stove top assembly according to claim 1 including a plurality of said heating units, each said first heat distributing layer being aluminum and having a heat conductivity factor of about 190 K cal/m.h.°C.

6. A stove top assembly according to claim 1 wherein said first heating unit includes a lower sheet of ductile material bonded to said heat distributing layer of material.

7. A stove top assembly according to claim 6 wherein said first heat distributing layer of material is aluminum and has a thickness between 0.5 and 10 mm.

8. A stove top assembly according to claim 1 wherein said first heat distributing layer has a circular shape and said bridge has an annular shape.

9. A stove top assembly according to claim 8 wherein said layer of ductile material is stainless steel, said first and second heat distributing layers of material being aluminum, said bridge being in overlapping relation to an annularly shaped portion of said second layer of material.

10. A stove top assembly according to claim 8 wherein said first heat distributing layer comprises a disk shaped portion and a surrounding annularly shaped portion having a higher coefficient of thermal expansion than said disk shaped portion.

* * * * *